United States Patent Office 3,030,208
Patented Apr. 17, 1962

3,030,208
LIGHT-SENSITIVE COMPOUNDS AND THEIR USE
IN THE REPRODUCTION TECHNIC
Wolf-Dietrich Schellenberg and Otto Bayer, Leverkusen, Germany, assignors to Farbenfabriken Bayer Aktiengesellschaft, Leverkusen, Germany, a corporation of Germany
No Drawing. Filed Feb. 20, 1957, Ser. No. 641,251
Claims priority, application Germany Mar. 14, 1956
12 Claims. (Cl. 96—35)

This invention relates to a new class of light-sensitive compounds and methods for their use in the reproduction technique. More particularly the invention is concerned with light-sensitive compounds being soluble polycondensation products predominantly linked through ester bonds and having

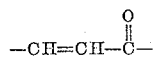

groups bonded to aromatic nuclei.

It is a primary object of the present invention to provide new light-sensitive compounds which can find various commercial applications. Another object of the invention is to provide new light-sensitive compounds which can be prepared from inexpensive chemicals. A further object of the invention is to provide novel organic compounds which are soluble in an organic solvent but upon exposure to light undergo chemical reaction and become cross-linked and insoluble in said solvent. A further object of the invention is to provide a new reproduction technique using these light-sensitive compounds. Still further objects will appear hereinafter.

It has been found that soluble polycondensation products containing predominantly ester bonds and comprising $$-CH=CH-\overset{O}{\underset{\|}{C}}-$$

groups bonded to aromatic nuclei, are cross-linked under the action of light and become insoluble. This fact allows the use of these soluble polycondensation products in the reproduction technique by exposing them to the action of light and afterwards dissolving out those parts of the polycondensation product not exposed and which, therefore, have not become insoluble. The polycondensation products to be used according to the invention can also contain acid amide, ether, and thioether groups as linking elements, in addition to the ester groups.

The production of such a soluble polycondensation product with

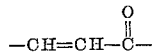

groups bonded to aromatic nuclei is carried out by using conventional esterification processes. Thus, for instance, a mixture of polyvalent alcohols and polyvalent acids may be heated to temperatures of from about 100 to about 300° C. while the water formed during the condensation distills off. Condensation may be carried out in vacuo. Another esterification process makes use of entrainers in which case water is removed by azeotropic distillation. When using methylesters instead of the free acids an ester interchange reaction may be carried out instead of the condensation of the free monomeric starting materials. It is, of course, possible to use dehydrating agents as catalysts such as p-toluene sulfonic acid, potassium acetate, or heavy metal salts.

Any polyhydric alcohol can be used with any polycarboxylic acid in the preparation of polyesters. Instead of the free acids their anhydrides, lower alkyl esters, or chlorides can be employed. It is within the scope of the present invention to use polycondensation products containing amido groups as linking elements in addition to the ester groups in which case a polyester amide is involved. This object can be achieved by the concurrent use of amino alcohols, diamines, or amino acids during the esterification procedure.

Examples of suitable polyhydric alcohols are ethylene glycol, diethylene glycol, triethylene glycol, propylene glycol, butylene glycol, hexamethylene glycol, thiodiglycol, oxalkylated thiodiglycol, trimethylol propane, pentaerythritol, sorbitol, mannitol.

Examples of suitable polycarboxylic acids or hydroxy acids are, for instance, succinic acid, adipic acid, o-, m- and p-phthalic acid, p-phenylene diacrylic acid, citric acid, ascorbic acid, aconitic acid, lactic acid, maleic acid, and tartaric acid.

Suitable compounds with amino groups are inter alia tetramethylene diamine, pentamethylene diamine, hexamethylene diamine, aromatic diamines such as o-, m-, p-phenylene diamine, ethanol amine, propanol amine, butanol amine, amino propionic acid, amino butyric acid, and E-amino caproic acid.

Care must be taken during the esterification that

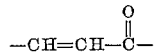

groups linked to aromatic nuclei are concurrently incorporated into the polycondensation product. For this purpose, either cinnamic acid and its derivatives or suitable chalcone compounds are concurrently employed.

Suitable cinnamic acid derivatives apart from cinnamic acid itself, are, for example, compounds of the following general formula:

wherein R represents one or more alkyl, aryl, aralkyl, alkoxy, nitro, amino, carboxyl groups or halogen or hydrogen atoms. R' can be, for instance, an OH group thus representing a free acid, a halogen atom thus representing an acid halide, a hydrocarbon radical thus representing a cinnamic acid ester, or a $NH_2$ group which may be substituted or unsubstituted, the formula thus representing a cinnamic acid amide.

It can be seen from this formula that it is also possible to use those cinnamic acid derivatives which contain in the molecule other functional groups which can be condensed.

For the present process it is advantageous to use cinnamic acid derivatives which are bifunctional or polyfunctional, whereby it is possible for particularly high concentrations of photo-active

groups bonded to aromatic nuclei to be incorporated into the polycondensation product.

Among the large number of compounds which can be used as cinnamic acid derivatives in the manufacture of the polycondensation product of the invention there are, for example, cinnamic acid, cinnamic acid methylester and the higher cinnamic acid alkylesters, cinnamic acid chloride, cinnamic acid amide, cinnamic acid dimethylamide, cinnamic acid ethanolamide, 3- and 4-nitrocinnamic acid, its esters, chlorides and amides, 3- and 4-aminocinnamic acid, 3- and 4-alkoxy cinnamic acid and the various cinnamic acids substituted by alkyl groups in the aromatic nucleus, and 3,3'-azo-cinnamic acid. Further examples are 3- and 4-carboxy cinnamic acid, 3- and 4-hydroxy cinnamic acid, 4,4'-phenylene diacrylic acid and the bis-glycol esters thereof, the condensation product of cyanuric chloride and 3 mols of 3-aminocinnamic acid, the condensation product of epichlorhydrin and 3-hydroxy cinnamic acid ester, 3-dihydroxy ethylamino cinnamic acid ester and also the condensation product of 2,4-dimethyl cinnamic acid ester and formaldehyde. It is also possible to employ as cinnamic acid derivative with cinnamic acid partially esterified polyvalent alcohols such as the pentaerythritol dicinnamic acid ester.

Chalcone compounds which are suitable for the present process are for example those of the following formulae:

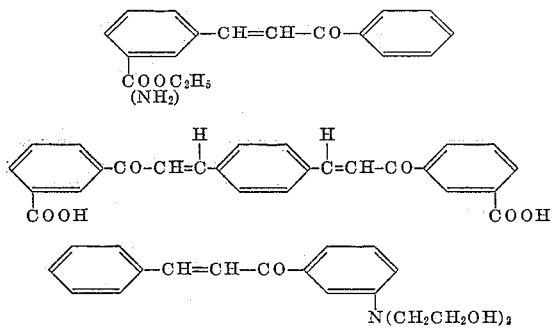

It is within the scope of the present invention to first prepare a polyester from alcoholic and acid starting materials without the concurrent use of, for instance, a cinnamic acid derivative which is reacted with the prefabricated polyester in a second step.

The condensation product should have a minimum molecular weight of about 750. It is preferred to use in the reproduction technique polycondensation products with a molecular weight of 2,000 and more. The polycondensation product should contain 1–25 parts of

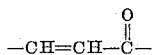

groups per 100 parts of polycondensation product. The best results are obtained when 20–25 parts of

groups are present for each 100 parts of polycondensation product.

When the soluble polycondensation products predominantly linked through ester bonds and having

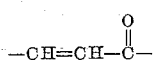

groups bonded to aromatic nuclei are exposed to actinic light their physical and chemical properties are changed more or less rapidly by polymerization or dimerisation of the double bonds of the cinnamic acid or chalcon derivative. A wide range of different light sources can be used, depending on the structure of the light-sensitive high polymer substance. Light with strong proportions of ultra-violet rays is particularly effective. The speed of the cross-linking caused by light irradiation can be further increased by adding sensitizers. As sensitizers, it is possible with particular advantage to use compounds from the class comprising cyanines, triphenyl methane dyestuffs, and dyestuffs of the benzanthrone, quinone or anthraquinone series. These dyestuffs sensitise the reaction products, particularly with respect to visible light. The degree of cross-linking depends on the strength of the exposure and the amount of the cinnamic acid derivative in the polymer, and can consequently easily be varied. In particular, the condensation products with

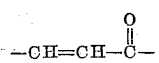

groups bonded to aromatci nuclei can be dissolved in organic solvents, whereupon films can be cast or filaments can be drawn from the solution with evaporation of the solvent. Due to the cross-linking initiated by the action of light, the substances become insoluble, harder and more insensitive to acids, alkali and solvents. The substances which are prepared by the process according to the invention and which can be cross-linked by the action of light can be used, for example, as coatings, foils and the like. It is also possible to produce moulded elements, the surface of which can be improved by subsequent exposure. With particular advantage, the compounds according to the invention can be used as auxiliaries in the reproduction art, since the action of light causes the layers of high molecular weight to cross-link at the places affected by the light, while those places which are not affected by the light remain unchanged. By after-treatment with a suitable solvent, the unexposed parts can then be dissolved out, so that layers graduated according to the picture are obtained with very sharp contours.

The invention is further illustrated by the following examples. All parts given are by weight.

*Example 1*

74 parts of phthalic acid anhydride (0.5 mol)
73 parts of adipic acid (0.5 mol)
148 parts of cinnamic acid (1 mol) and
92 parts of glycerine are thoroughly mixed and slowly heated in an oil bath to an internal temperature of 200° C. The esterification is stopped after 18 hours. The polyester which is formed now only contains 2.6% of OH groups, the acid number has fallen to 46.3 and the polyester has a mean molecular weight of approximately 760. From a solution of the polyester in acetone, it is possible to draw films which quickly becme insoluble upon exposure to a carbon filament lamp and can be used for reproduction purposes.

*Example 2*

37 parts of phthalic acid anhydride (0.25 mol)
36.5 parts of adipic acid (0.25 mol)
148 parts of 4-nitro cinnamic acid (1 mol) and
66 parts of pentaerythritol (0.5 mol)

are thoroughly mixed and slowly heated in an oil bath to an internal temperature of 200° C. The esterification is stopped after 18 hours. The polyester which is formed now only contains 5.5% of OH groups, the acid number has fallen to 12 and the polyester has a mean molecular weight of approximately 1900. From a solution of the polyester in acetone, it is possible to draw films which quickly become insoluble upon exposure to a carbon filament lamp and can be used for reproduction purposes.

*Example 3*

37 parts of phthalic acid anhydride (0.25 mol)
36.5 parts of adipic acid (0.25 mol)
148 parts of 4-methoxy cinnamic acid (1 mol) and
69 parts of glycerine (0.75 mol)

are thoroughly mixed and slowly heated in an oil bath to an internal temperature of 200° C. The esterification is stopped after 18 hours. The polyester has a molecular weight of approximately 1050. From a solution of the polyester in acetone, it is possible to draw films which quickly become insoluble upon exposure to a carbon filament lamp and can be used for reproduction purposes.

*Example 4*

39.6 parts of pentaerythritol dicinnamic acid ester
7.4 parts of phthalic acid and
7.3 parts of adipic acid are thoroughly mixed and slowly heated in an oil bath to an internal temperature of 200° C. The esterification is stopped after 18 hours. The polyester which is formed now only contains 3.1% of OH groups, the acid number has fallen to 5.4 and the polyester has a molecular weight of approximately 1800. From a solution of the polyester in acetone, it is possible to draw films which quickly become insoluble upon exposure to a carbon filament lamp and can be used for reproduction purposes.

Example 5

500 parts of benzene, 220 parts of p-carboxy cinnamic acid dimethyl ester, 146 parts of glycol diacetate and 4 parts of p-toluene sulfonic acid are mixed and heated for 18 hours to about 80° C. A resin is obtained having a molecular weight of 2500. When the resin is exposed to a carbon filament lamp it quickly becomes insoluble.

Example 6

265 parts of p-methoxy cinnamic acid diethanol amide, 73 parts of adipic acid, 74 parts of phthalic acid anhydride and 4 parts of p-toluene sulfonic acid are heated for 18 hours to about 100° C. A resin is obtained with a molecular weight of about 2000 the resin being soluble, for instance, in acetone. From a solution of the polyester amide in cyclohexanone it is possible to draw films which quickly become insoluble upon exposure to ultraviolet light.

Although the invention has been described in the foregoing for the purpose of illustration, it is to be understood that such detail is solely for this purpose and that variation may be made by those skilled in the art without departing from the spirit and scope of the invention except as may be set forth in the claims.

What is claimed is:

1. A reproduction method which comprises exposing to the action of actinic light a polyester of a polyhydric alcohol and a polycarboxylic acid, said polyester being soluble in an organic solvent and containing as an essential recurring integral portion a

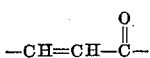

grouping, said grouping being attached through the —CH=CH— end to an aromatic nucleus and through the

end to a member selected from the group consisting of aromatic nuclei, o-alkylene radicals and amido nitrogen, thus converting said polyester to an insoluble cross-linked resin.

2. The process of claim 1 wherein the aromatic nuclei corresponds to the formula

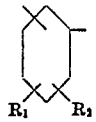

wherein $R_1$ and $R_2$ are each selected from the group consisting of lower alkyl, aryl, aralkyl, alkoxy, nitro, amino, —COOH, halogen, and H.

3. Process of claim 1 wherein the soluble polycondensate has a molecular weight of at least 750.

4. Process of claim 1 wherein the soluble polycondensate has a molecular weight of at least 750 and the

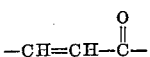

groups constitute 1–25% by weight thereof.

5. Process of claim 1 wherein the soluble polycondensate has a molecular weight of at least 2000 and the

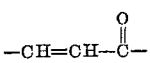

groups constitute 20–25% by weight thereof.

6. A method of reproducing the image of an object which comprises coating a support with a soluble polycondensate as defined in claim 1 to thereby obtain a photo-sensitive surface, exposing said surface to a light source located behind said object to effect cross-linkage thereof, and then treating the exposed surface with a developer which dissolves the unchanged portions thereof to produce a negative representing said object.

7. A reproduction process which comprises exposing to the action of actinic light an acetone-soluble photosensitive film prepared by polyesterification in the absence of light of phthalic anhydride, adipic acid, cinnamic acid, and glycerine, the resulting polyester having a molecular weight of at least 750 and containing 1–25% by weight of ketone linkages of the formula

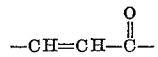

in the polymer chain; and thereby converting the exposed surface to an insoluble cross-linked resin.

8. A reproduction process which comprises exposing to the action of actinic light an acetone-soluble photosensitive film prepared by polyesterification in the absence of light of phthalic anhydride, adipic acid, 4-nitro-cinnamic acid, and pentaerythritol, the resulting polyester having a molecular weight of at least 750 and containing 1–25% by weight of ketone linkages of the formula

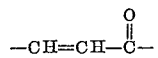

in the polymer chain; and thereby converting the exposed surface of the film to an insoluble cross-linked resin.

9. A reproduction process which comprises exposing to the action of actinic light an acetone-soluble photosensitive film prepared by polyesterification in the absence of light of phthalic anhydride, adipic acid, 4-methoxy-cinnamic acid, and glycerine, the resulting polyester having a molecular weight of at least 750 and containing 1–25% by weight of ketone linkages of the formula

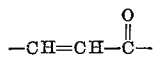

in the polymer chain; and thereby converting the exposed surface of the film to an insoluble cross-linked resin.

10. A reproduction process which comprises exposing to the action of actinic light an acetone-soluble photosensitive film prepared by polyesterification in the absence of light of phthalic acid, adipic acid, and pentaerythritol dicinnamic acid ester, the resulting polyester having a molecular weight of at least 750 and containing 1–25% by weight of ketone linkages of the formula

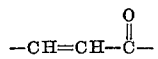

in the polymer chain; thereby converting the exposed surface of the film to an insoluble cross-linked resin.

11. A reproduction process which comprises exposing to the action of actinic light an acetone-soluble photosensitive film prepared by polyesterification in the absence of light of a major amount by weight of benzene and a minor amount by weight of p-carboxy cinnamic acid dimethyl ester, glycol diacetate, and p-toluene sulfonic acid, the resulting polyester having a molecular weight of at least 750 and containing 1–25% by weight of ketone linkages of the formula

in the polymer chain; thereby converting the exposed surface of the film to an insoluble cross-linked resin.

12. A reproduction process which comprises exposing to the action of actinic light an acetone-soluble photosensitive film prepared by polyesterification in the absence of light of phthalic anhydride, adipic acid, p-methoxy cinnamic acid diethanolamide, and p-toluene sulfonic acid, the resulting polyester having a molecular weight of at least 750 and containing 1-25% by weight of ketone linkages of the formula

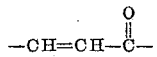

in the polymer chain; thereby converting the exposed surface of the film to an insoluble cross-linked resin.

References Cited in the file of this patent
UNITED STATES PATENTS

| 1,975,246 | Zwilgmeyer | Oct. 2, 1934 |
| 2,787,546 | Smith et al. | Apr. 2, 1957 |
| 2,816,091 | Smith et al. | Dec. 10, 1957 |

OTHER REFERENCES

Chemical Abstracts, 50, 12,500 (1956).